United States Patent [19]
Renner et al.

[11] Patent Number: 5,154,125
[45] Date of Patent: Oct. 13, 1992

[54] MULTI-LEVEL FOLDING STEP FOR TRACK-BOUND VEHICLES

[75] Inventors: Anton Renner, Huisheim; Franz Hofer, Donauworth, both of Fed. Rep. of Germany

[73] Assignee: Man GHH Schienenverkehrstechnik GmbH, Nuremberg, Fed. Rep. of Germany

[21] Appl. No.: 700,545

[22] Filed: May 15, 1991

[30] Foreign Application Priority Data

May 23, 1990 [DE] Fed. Rep. of Germany ....... 4016620

[51] Int. Cl.$^5$ ............................................. B61D 23/00
[52] U.S. Cl. .................... 105/447; 105/349
[58] Field of Search .............. 105/443, 445, 447, 358, 105/448, 450, 449, 437, 444, 348, 341, 349; 182/88, 95, 127, 93, 96, 97; 280/163, 164.1, 166; 296/37.6, 37.1, 37.5, 62; 244/137.2, 129.6

[56] References Cited

U.S. PATENT DOCUMENTS

| | | | |
|---|---|---|---|
| 1,109,224 | 9/1914 | Herrin ................................. | 105/445 |
| 1,148,356 | 7/1915 | Chickering ............................ | 182/88 |
| 3,083,784 | 4/1963 | Urian ..................................... | 182/88 |
| 3,955,827 | 5/1976 | Wonigar ............................... | 280/166 |
| 4,014,486 | 3/1977 | Nelson et al. ....................... | 105/447 |
| 4,216,725 | 8/1980 | Hallam ................................. | 105/443 |
| 4,275,664 | 6/1981 | Reddy .................................. | 105/450 |
| 4,453,684 | 6/1984 | Hanks ................................... | 244/129.6 |
| 4,583,466 | 4/1986 | Reddy et al. ........................ | 105/447 |
| 4,615,275 | 10/1986 | Ishiznka ............................... | 105/447 |
| 4,757,876 | 7/1988 | Peacock .............................. | 182/95 |

FOREIGN PATENT DOCUMENTS

| | | |
|---|---|---|
| 0604558 | 9/1960 | Canada ................................ 105/443 |
| 0142851 | 5/1989 | European Pat. Off. . |
| 0345706 | 12/1989 | European Pat. Off. ............ 105/443 |
| 1605042 | 4/1975 | Fed. Rep. of Germany . |
| 3301746 | 1/1987 | Fed. Rep. of Germany . |

*Primary Examiner*—Robert J. Oberleitner
*Assistant Examiner*—Mark T. Le
*Attorney, Agent, or Firm*—Morrison Law Firm

[57] ABSTRACT

A folding staircase for track-bound vehicles comprises a base ladder part, movably carried in the vehicle, and a swinging ladder part hingedly carried by the base ladder part. The base ladder part is movable between a stowed position and an extended position whereat it extends from the vehicle generally in the direction of travel. The swinging ladder part is rotatable between a first position, whereat it overlies the base ladder part, and a second position, whereat it extends from the distal end of the base ladder part to the track. Devices are provided for displacing the base ladder portion from the stowed position to the extended position and for displacing the swinging ladder part from the first position to the second position.

4 Claims, 2 Drawing Sheets

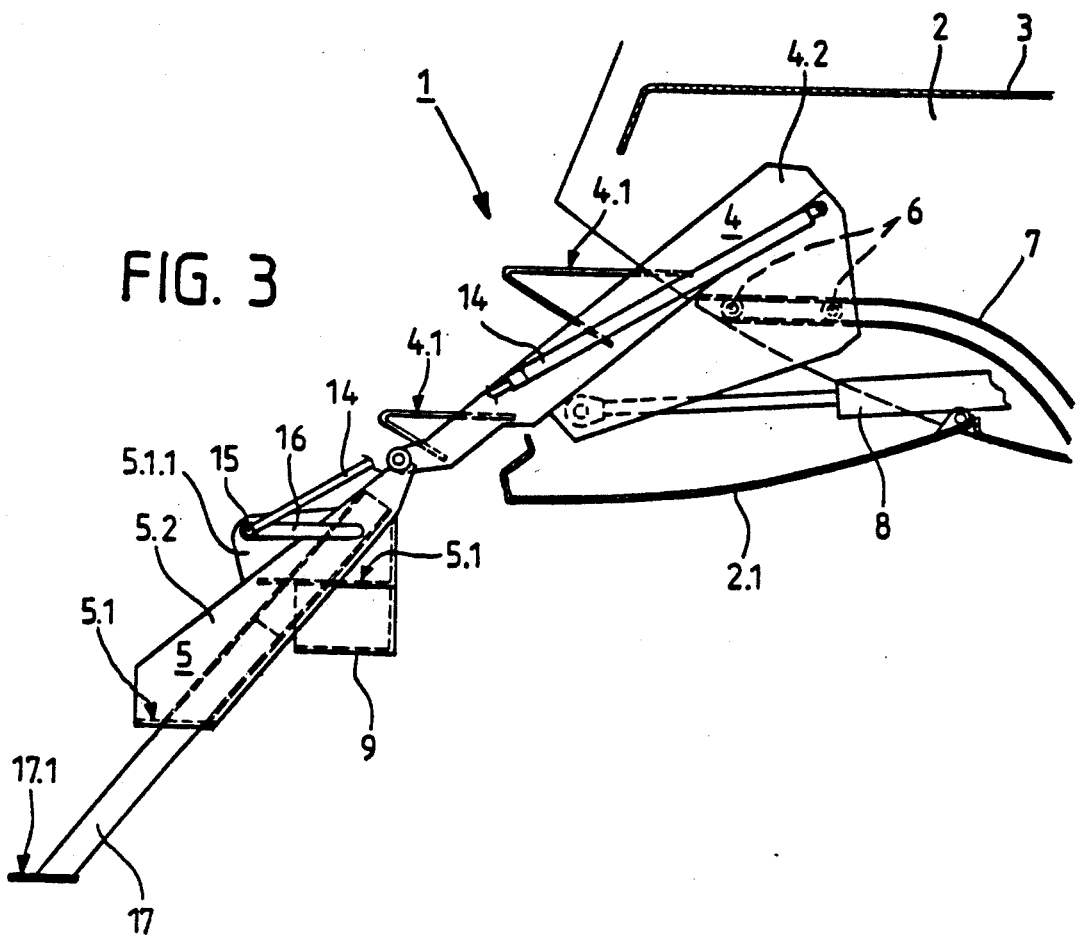
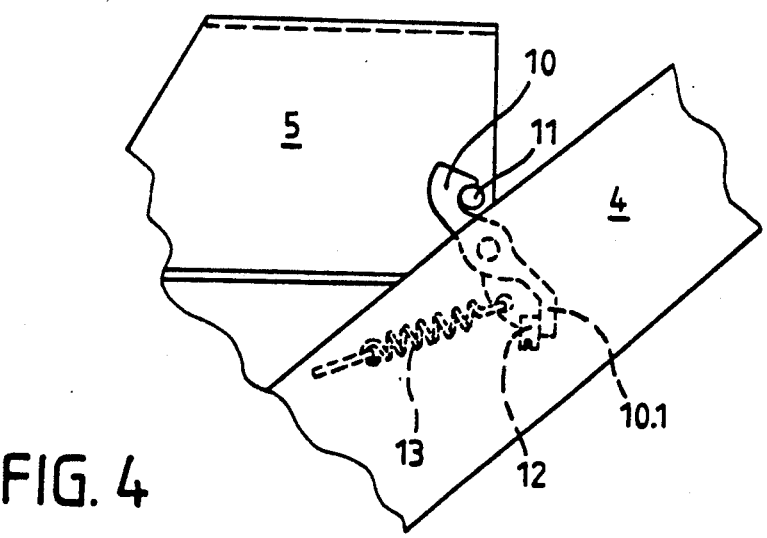

5,154,125

MULTI-LEVEL FOLDING STEP FOR TRACK-BOUND VEHICLES

BACKGROUND AND SUMMARY OF THE INVENTION

The invention relates to a folding step for track-bound vehicles, especially railroad cars.

The problem arises, in the case of vehicles travelling on an elevated roadway, of making it possible for passengers to climb out over the front sides of the vehicle in the event of an emergency stop, either onto the roadway as a gangway or at least to transfer to a vehicle opening for assistance purposes. It is not possible for the folding steps of the type mentioned at the outset known in the case of railroad vehicles from DE-PS 16 05 042 or DE-PS 33 01 746, for example, to satisfy these two functions, because they are limited to normal getting on and getting off and are consequently designed only for steps for normal folding out or in (or swinging in or out) obliquely to the longitudinal median plan of the vehicle. To the extent that an emergency exiting is proposed for the front side of a vehicle on rails, it is limited according to EP 0 142 851 to a special design of a front-end vehicle door and its used as a foldable stair ramp.

The object of the invention is therefore that of creating a folding step of the type mentioned at the outset for emergency exiting by means of front-side vehicle exits closed by simple doors, which make it possible to either leave the vehicle by the front side, if desired, or by transfer to another opening vehicle or by climbing down to a passable roadway.

SUMMARY OF THE INVENTION

The folding step in accordance with the invention is not only space-saving, for example a ladder capable of stowage in an underfloor chamber, which by simple change in position at first provides a transfer bridge support, if necessary to a similar element in a second vehicle or, starting from this change in position, a stairway to be used for getting off by simple unfolding. This change in position can be performed safely by simple technical means. Moreover, the use form "stairway" can result from the use form "transfer bridge support" without any manual intervention, for which purpose it only requires the swinging out of the base ladder part into its end position. A gentle unfolding of the ladder or the swinging ladder part can be achieved by means of the end position cushioning of the pneumatic spring. Finally, the swinging ladder part can even be adapted to various roadway heights, which of course also applies for the design of this further ladder part (if necessary, capable of telescopic change in length).

BRIEF DESCRIPTION OF THE DRAWING

The invention is illustrated further below by means of an execution example. The drawings present the following features.

FIG. 3 on a smaller scale, the folding step according to FIG. 1 in the position according to FIG. 2 and in unfolded position;

FIG. 4 an enlarged representation of the folded position of the locking agent securing the folding step.

DESCRIPTION OF THE PREFERRED EMBODIMENT

Figure 1:
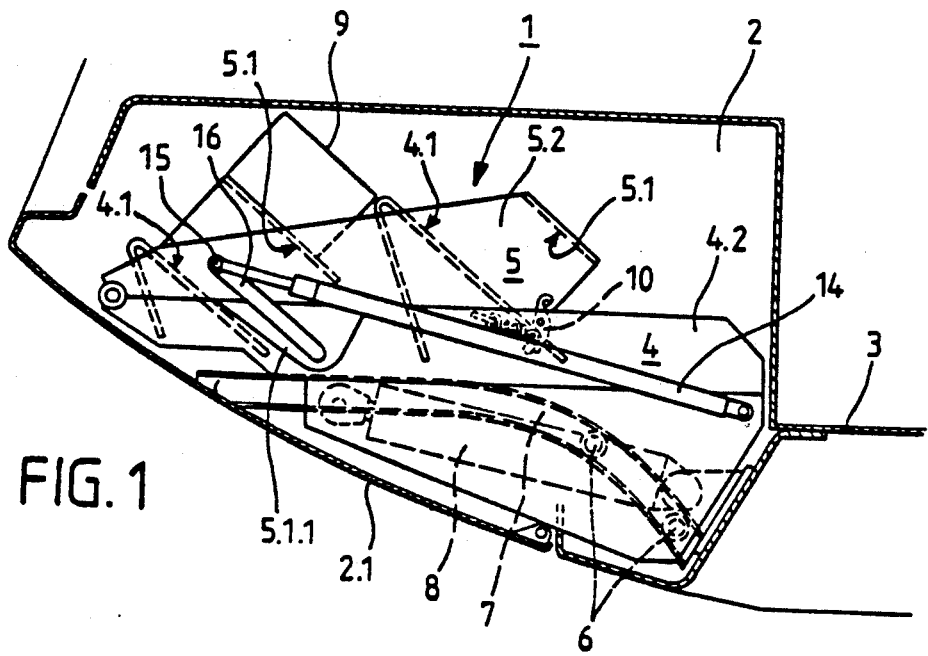
FIG. 1 a side view of a folded folding step of a vehicle on rails in folded position and in retracted position on the vehicle front side.
Figure 2:
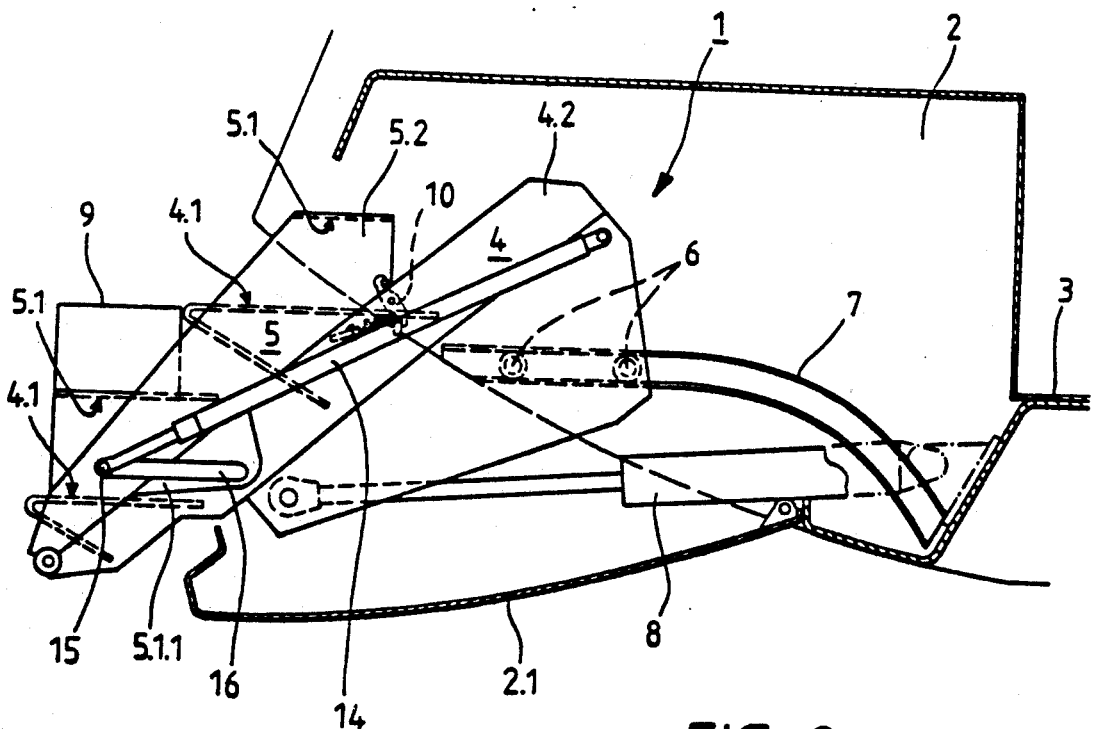
FIG. 2 the folding step according to FIG. 1 in swung-out position.

In the case of a railroad installation with vehicles for passenger transport track-bound on an elevated roadway, they are equipped with the folding step represented in FIGS. 1 to 3 for emergency exiting by front-side vehicle exits, which can be swung in or out in the form of foldable ladder 1 in relation to separate chamber 2 at floor 3 of the individual (not otherwise represented) vehicle with disengageable cover 2.1. The basic components of this ladder 1 are base ladder part 4 and swinging ladder part 5 pivoted around an axis with angle of rotation running obliquely to the vehicle direction, which are always provided with steps 4.1 or 5.1 between spars 4.2 or 5.2. Base ladder part 4 is movable longitudinally by rollers 6 at both its spars 4.2 in bent guide rails 7, which describe a guide course of curvature such that base ladder part 4 necessarily undergoes a change in position on moving, e.g., by means of hydraulic or pneumatic working cylinder 8, from the swung-in (stowage) position of stepladder 1 (FIG. 1) into swung-out position (FIG. 2). As a result of this change in position, steps 4.1 of base ladder part 4 already assume the position in which they are passable according to FIGS. 2 and 3. In this swung-out position of base ladder part 4, ladder 1 necessarily has the function of a transfer bridge half over which, for example, persons can reach an unrepresented other such (opening) transfer bridge half of another open vehicle. In the process, swinging ladder part 5, as in the swung-in position of ladder 1 (FIG. 1), is kept locked at base ladder part 4 and is passable over staircase 9, which connects at the already free upper step 4.1 of base ladder part 4. The locking of swinging ladder part 5 at base ladder part 4 in folded position according to FIGS. 1 and 2 is brought about at the ladder by locking hook 10 at base ladder part 4 engaging with locking peg 11 at swinging ladder part 5. This locking is automatically released as soon as base ladder part 4 in the swung-out position represented in FIG. 2 is brought into an end position, for whose adjustment only a certain increase in the pressure force of working cylinder 8 is necessary. As is shown in FIG. 4, base ladder part 4 is stopped in swung-out position (FIG. 2) on reaching its end position by means of a directive catch (on each ladder side), in which stationary, i.e., vehicle-side catch 12 blocks locking hook 10 by lever stop 10.1 of same swingable at base ladder part 4 and kept in locked position by coil spring 13, and on suitable compressive force on base ladder part 4 it provides release at locking pin 11. In the return direction of base ladder part 4, this stationary catch 12 is swingable away against spring force by lever stop 10.1, and is thus no impediment. In the end position of base ladder part 4 with unlocked swinging ladder part 5, the latter and therewith ladder 1 are automatically unfolded, according to FIG. 3 with swinging of swinging ladder part 5 into a position (preferably aligning) directed downward with base ladder part 5. Other steps 4.1 and 5.1 ar thereby released. The back side of the now functionless staircase 9 is now suitably designed for use as step 5.1. The automatic unfolding of stepladder 1 causes springiness, preferably from pneumatic spring 14 (on each ladder side), thus a piston-cylinder unit with enclosed compressible medium, which on the one hand is pivoted swingably at base ladder part 5 and on the other hand engages by roller 15 into crank guide 16 extending at swinging ladder part 6, for which it requires console 5.1.1 at spar 5.2 of swingable ladder part 5. Because of this crank guide 16 for the swinging ladder part end of individual pneumatic spring 14, its expansion results in a swinging movement of swinging ladder part 5 around the full unfolding angle of ladder 1, namely 180° in the completely unfolded position according to FIG. 3. In this position, ladder 1 performs the function of a stairway to an unrepresented roadway of the traveling element. According to the design, swinging ladder part 5 can have a changeable length according to FIG. 3 by means of movably integrated further ladder part 17 with steps 17.1 for adaptation of height differences as required. If necessary, this ladder part 17 can also be designed for telescopic change in length.

What is claimed is:

1. A folding staircase for track-bound vehicles, comprising:
   a base ladder part movably carried in the vehicle for movement between a stowed position and an extended position whereat it extends from the vehicle generally in the direction of travel;
   first displacing means for displacing said base ladder portion from said stowed position to said extended position;
   a swinging ladder part hingedly carried by said base ladder part for rotation, about a line generally transverse to the travel direction, between a first position, whereat it overlies said base ladder part, and a second position, whereat it extends from the distal end of said base ladder part to the track; said swinging ladder part having a first stair-like surface, exposed when said swinging ladder part is in said first position and a second stair-like surface, exposed when said swinging ladder is in said second position; and
   second displacing means, operatively connecting said base ladder part and said swinging ladder part, for displacing the latter from said first position to said second position.

2. A folding staircase according to claim 1, further comprising a pair of channel-like guide rails opposingly disposed in the vehicle, said base ladder part being disposed between and slidingly carried by said guide rails.

3. A folding staircase according to claim 1 wherein said second displacing means includes at least one pneumatic actuator.

4. A folding staircase according to claim 1, further comprising an extension ladder part slidingly carried by said swinging ladder part.

* * * * *